United States Patent [19]

Lavon

[11] Patent Number: 4,667,748

[45] Date of Patent: May 26, 1987

[54] METHOD OF DRIVING AN ELEMENT AND AN HYDRAULIC IMPACTOR

[75] Inventor: Erik V. Lavon, Saltsjö-Boo, Sweden

[73] Assignee: Atlas Copco Aktiebolag, Nacka, Sweden

[21] Appl. No.: 767,699

[22] Filed: Aug. 21, 1985

Related U.S. Application Data

[63] Continuation of Ser. No. 535,888, Sep. 26, 1983, abandoned.

[30] Foreign Application Priority Data

Sep. 30, 1982 [SE] Sweden ............................... 8205574

[51] Int. Cl.[4] ......................... B23B 45/16; F01B 31/00

[52] U.S. Cl. .................................... 173/119; 173/134; 92/87

[58] Field of Search ............... 173/138, 125, 119, 116, 173/134; 91/402, 408; 92/87

[56] References Cited

U.S. PATENT DOCUMENTS

| | | | |
|---|---|---|---|
| 3,728,944 | 4/1973 | Marrara | 92/87 |
| 3,818,805 | 6/1974 | Johansson | 92/87 X |

FOREIGN PATENT DOCUMENTS

| | | | |
|---|---|---|---|
| 901498 | 2/1982 | U.S.S.R. | 173/119 |
| 958652 | 9/1982 | U.S.S.R. | 173/134 |

*Primary Examiner*—E. R. Kazenske
*Assistant Examiner*—Willmon Fridie, Jr.
*Attorney, Agent, or Firm*—Frishauf, Holtz, Goodman & Woodward

[57] ABSTRACT

In an impactor, e.g. a jack hammer, a liquid column is accelerated through an empty barrel 26 and it impacts on a piston surface (34) of the tool (24), e.g. a chisel.

10 Claims, 8 Drawing Figures

METHOD OF DRIVING AN ELEMENT AND AN HYDRAULIC IMPACTOR

This application is a continuation of application Ser. No. 535,888, filed Sept. 26, 1983, now abandoned.

BACKGROUND OF THE INVENTION

This invention relates to a method of driving an element by means of a liquid column. The invention also relates to an hydraulic impactor of the kind in which a piston surface of a driven member, for example a chisel, is loaded by means of a liquid column.

In U.S. Pat. No. 4,089,380 an hydraulic impactor is shown in which a hammer piston of steel impacts on an anvil with trapped liquid through which the impact energy is transmitted to a chisel. Although the liquid anvil permits a higher impact velocity of the hammer piston than the velocity that can be permitted if the hammer piston impacts directly on the chisel, the hammer piston is still heavy and thus, the entire impactor is heavy and large.

'In U.S. Pat. No. 4,289,275 a cannon for shooting a liquid column is described which is invented by the same inventors as present invention. The cannon is intended for shooting the column into a pre-drilled blind hole in a rock boulder in order to split the boulder.

In U.S. Pat. No. 4,264,107 a demolition tool is shown in which a gas pressure accumulator is used to drive a tool through the medium of a liquid. The liquid and the tool accelerate together and the liquid does not impact on the tool.

SUMMARY OF THE INVENTION

It is an object of the present invention to provide for an impactor which is small and light in weight relative to its impact power, and to provide a simple method for applying a shock load on a piston surface of a tool. Instead of a steel hammer, a liquid column is used as a hammer.

BRIEF DESCRIPTION OF THE DRAWINGS

Two embodiments of the invention will be described with reference to the accompanying drawings.

FIG. 6 is a diagram of the system for operating the impactor of FIGS. 1–5.

FIG. 7 shows the impactor of FIGS. 1–5 mounted on a crawler wagon.

FIG. 8 is a fragmentary longitudinal section through a modified impactor.

DETAILED DESCRIPTION

Figure 1:
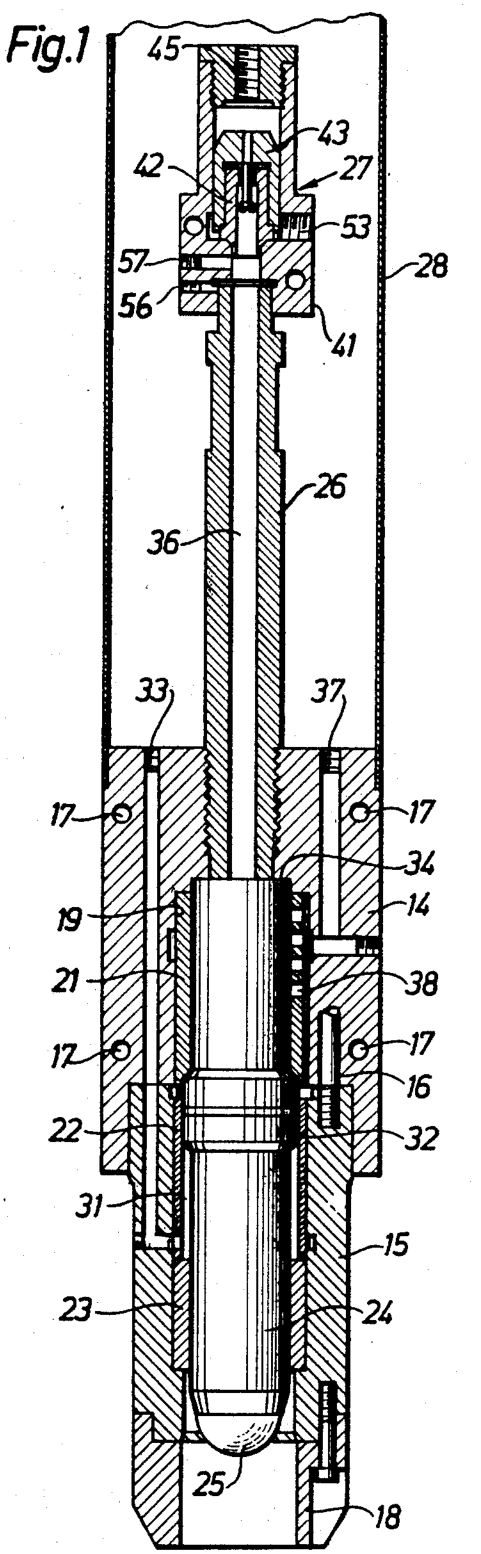
FIG. 1 is a longitudinal section through an impactor according to the invention.
Figure 2:
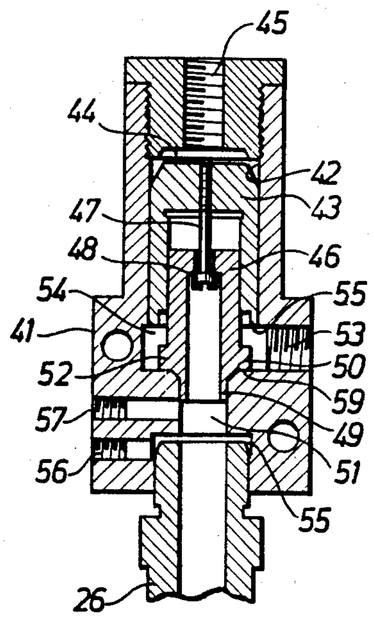
FIGS. 2 and 3 are enlarged sections of a part of FIG. 1 and they show some details in other relative positions.
Figure 3:
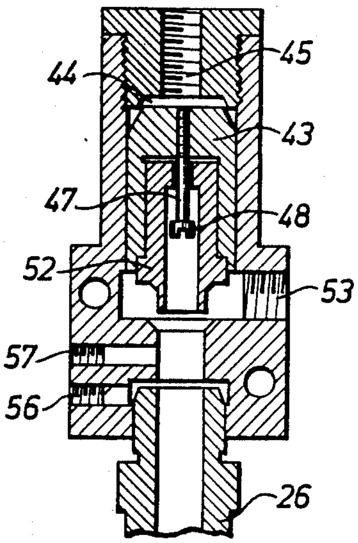

With reference to FIGS. 1, 2, and 7 the hydraulic impactor 11 in the form of a jack hammer is shown in FIG. 7 mounted on the distal end of a power operated articulated carrier arm 12 that is mounted on a mobile chassis 13. The impactor 11 comprises a two piece housing 14, 15. The members 14, 15 of the housing are held together by means of four bolts 16. The rear member 14 of the housing 14, 15 has four transverse holes 17 for screws by which it can be secured to the carrier arm 12. A front end piece 18 is releasably mounted to the front member 15 of the housing 14, 15. The housing 14, 15 has a stepped longitudinal bore 19 lined by three abutting sleeves 21–23 which form a cylinder for a driven member in the form of a chisel 24 with a semi-spherical tip end insert 25. A barrel 26 is affixed to the member 14, by being screwed into the bore 19, and a valve unit 27 is screwed on to the rear end of the barrel 26 so that it is affixed thereto. A protecting cap 28 is affixed to the member 14 and surrounds the barrel 26.

An annular cylinder chamber 31 is formed below a widened portion 32 of the chisel 24 and a passage 33 leads to the chamber 31. The rear end face 34 of the chisel 24 defines a wall of a cylinder chamber 35 at the rear of the chisel. This cylinder chamber 35 is better shown in FIG. 4 than in FIG. 1. The central passage 36 (the bore) of the barrel 26 leads to the cylinder chamber 35. A vent passage 37 leads from a number of ports 38 in the sleeve 21. The ports 38 are blocked by the widened portion 32 of the chisel 24 when the chisel is in its rearmost position in which it is shown in FIG. 1.

All reference numerals of the valve unit 27 are indicated on FIG. 2 only. On the other Figures, including FIG. 1, only some of the reference numerals are indicated. The valve unit 27 comprises a housing 41 screwed onto the barrel 26. A cylinder 42 is formed in the housing 41 and a cap 43 is slidable in the cylinder 42. At the rear of (above) the cap 43, a cylinder chamber 44 is formed into which a passage 45 leads. A valving element 46 is slidably arranged in the cap 43 and a screw 47 is screwed into the cap and has its head 48 inside the valving element 48. The valving element 46 has an annular end portion 49 which extends into an extension 51 of the barrel bore 36 and forms a slide valve therewith. A front end surface 59 of a flange 52 of the valving element 46 forms a seat valve with a seat 50 in the housing 41. A trigger passage 53 opens into an annular chamber 54 in which the end face 55 of the cap 43 is located. Between the barrel 26 and the valve unit housing 27 there is an annular chamber 55 around the barrel bore 36, and a passage 56 leads to the annular chamber 55. A passage 57 with a pre-loaded check valve 58 FIG. 6 leads from the annular chamber 55 to tank. The check valve 58 is so pre-loaded that the air pressure in passage 56 will not open the valve. The check valve 58 should, however, open at a pressure slightly above the air pressure so that the liquid will always be free to flow out through the passage 57.

In FIG. 6, the drive system for the impactor is shown diagrammatically. The passages 33, 37, 45, 53, 56, 57 described above with reference to FIGS. 1 and 2 and their extensions in the form of hoses or pipes have been given the same reference numerals as in FIGS. 1 and 2. In FIG. 6, a tank 61 with a pump 62, a compressor 63, two pressure regulators 64, 65 with manometers 66, 67, and a trigger valve 68 are shown. The pressure regulators 64, 65 are of the type that have over flow outlets 69, 70 coupled to tank through a return hose 71. The trigger valve 68 has also an outlet 72 coupled to the return hose 71. The supply line that leads from the pump 62 to the trigger valve 68 has been designed by the reference numeral 73. In the tank 61, which is filled with a suitable liquid, e.g. hydraulic oil, there is atmospheric pressure. Water can be used instead of oil.

In FIG. 7, the tank 61 and the compressor 63 are shown mounted on the chassis 13. All the passages 33, 37, 45, 53, 56, 57, 71 are schematically shown as a bundle of hoses 74 which extend along the carrier arm 12.

The operation of the impactor shown on FIGS. 1-7 will now be described.

The continuously applied pressure in the chamber 31 holds the chisel 24 in its normal rearmost position in which it is shown in FIG. 1. The cap 43 holds the valving element 46 in its closed normal position as shown in FIG. 1. The barrel 26 is pressurized by compressed air through the passage 56 and there is no liquid in the barrel bore 36. The trigger valve 68 is closed and the trigger passage 53 is drained. When the trigger valve 68 is manually switched to pressurize the trigger passage 53, the pressure in the chamber 55 forces the cap 43 backwardly but maintains the valving element 46 in its position.

The area ratio between the two piston areas of the cap 43 adjacent the pressure chambers 44 and 55 and the ratio of the pressures therein should be such that the cap 43 should not start its movement until the desired pressure has built up in the trigger passage 53.

During its rearward movement, when the cap 43 reaches its position of FIG. 2 the head 48 of the screw 47 will engage the back end of the valving element 46 as shown in FIG. 2 and lift the valving element 46 off its seat. As a result, the pressure acting on the front end surface 59 of the flange 52 will start to accelerate the valving element 46 rearwardly. When the valving element 46 has moved a predetermined distance and reached a high velocity e.g. 25 m/s, its slide valve portion 49 opens the barrel bore 36 to the trigger passage 53 very quickly and a liquid column or charge is formed which rushes down the barrel bore 36 and impacts on the end face 34 of the chisel. Since the liquid cannot escape, the liquid column is suddenly retarded upon the impact so that its momentum is transformed to pressure which acts on the end face 34 of the chisel. The air present in the barrel bore 36 is entrapped and cannot escape. However, the entrapped air seems not to be disadvantageous. It probably dissolves in the liquid.

Since the valving element 46 reaches a high velocity before it starts to open, it will take only a fraction of a millisecond for the valving element 46 to move from its position in which it begins to open into its fully open position. The valving element 46 is shown in its open fully position in FIG. 3.

Figure 4:
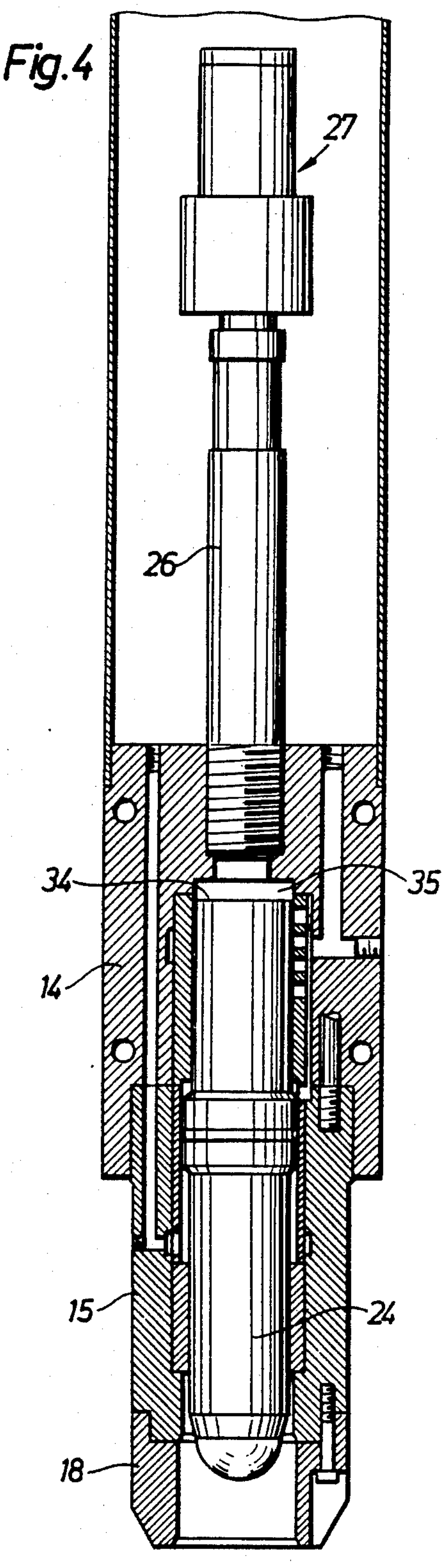
FIGS. 4 and 5 correspond to FIG. 1 but they show some details in other relative positions.
Figure 5:
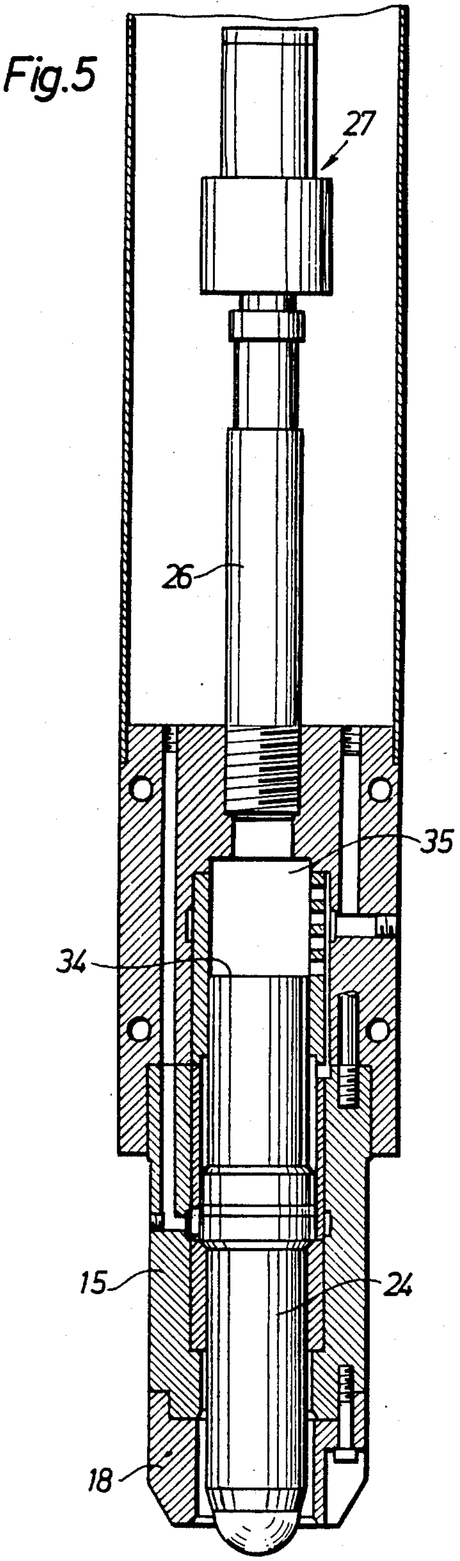

The pressure on the end face 34 increases rapidly and becomes many times the stagnation pressure and since the area of the end face 34 is many times the area of the barrel bore 36, that is many times the area of the liquid column, the force on the chisel 24 will be great and the chisel will be forced forwardly as can be seen in FIG. 4. The elasticity of the trigger hose 53 and the inherent compressibility of the liquid will provide for a sufficient volume of oil for forming the liquid column and accelerating it. The accumulated volume has been proved to be about 3% when a regular hydraulic hose for a rated burst pressure of 1300 bar is pressurized to 400 bar. It is advantageous that the trigger hose 53 can be used as an accumulator for pressure fluid and that no separate nitrogen-filled accumulator be needed. Of course, the impactor can be designed to have an accumulator volume of liquid operationally coupled between the hose 53 and the valve 27 in order to permit the use of a hose with a smaller diameter. The annular chamber 55 at the upper end of the barrel is not harmful to the acceleration of the liquid column. The area of the end face 34 should be greater than the area of the barrel for example more than 4 times greater or more than 10 times greater as illustrated in the Figures.

When the valving element 46 closes, the chisel opens or has opened one or more of the ports 38 as can be seen in FIG. 4, so that the air from the passage 56 rushes down the barrel and cylinder chamber and out through the vent passage 37 so that it flushes away the remaining liquid. The continuously applied pressure in the cylinder chamber 31 will force the chisel 24 back to its normal position of FIG. 1 and the impactor will be ready for a new shot.

The valving element 46 can be so designed that the rise in dynamic pressure of the liquid will reduce the static pressure so much that the pressure in the chamber 44 will close the valve which should occur about simultaneously with the liquid column impacting on the chisel.

Advantageously, the pressure build-up in the trigger hose 53 should be so slow that the barrel bore 36 has been vented and the chisel has returned to its rearmost position before the valve again opens, so that the impactor will have a repetitive operation as long as the trigger valve 68 is maintained open. The impactor can be designed to operate for example at a frequency of 1 Hz. The trigger valve 68 can advantageously be mono-stable push button valve which is stable in its position in which it blocks the supply passage 73 and drains the trigger passage 53. Then, if the push button is held down less than about 1-2 seconds, the impactor will give a single impact. The impactor can of course also be designed to give only a single impact when the trigger valve 68 is opened independently of whether the trigger valve is maintained open or not.

When the illustrated impactor is used as a jack hammer, its front end piece 18 can be forced against the work, e.g. against a rock boulder. Then, the chisel 24 is accelerated by the liquid column so that it hits the rock boulder to split it. Alternatively, the front end piece 18 can be removed so that the chisel 24 will be in engagement with the rock boulder before the liquid column hits the chisel. When the liquid column hits the end face 34 of the chisel 24, its momentum is transformed to a pressure which acts on the end face 34. The end face 34 can be considered as a piston surface. The distance between the end face 34 of the chisel and the annular chamber 55, that is the length of the closed chamber formed by the barrel and the end face 34 of the chisel, will define the duration of the pressure pulse that acts on the end face 34. The air that becomes entrapped in front of the liquid column has no adverse effect. It seems likely that it becomes dissolved in the liquid and that it assists in forcing the liquid out of the barrel after the shot.

In a jack hammer of the kind described, the chisel can have a weight of 100 kg whereas the volume of the liquid column can be a quarter of a liter. Such a jack hammer can be mounted on the arm of an excavator and it can be coupled to the hydraulic system of the excavator. The pressure levels of the systems of the carriers can vary but the jack hammer will operate at any pressure level presently used. The impact energy will of course vary with the pressure level.

It seem not necessary that the liquid column impacts directly on the end face 34 of the chisel. If the lowest part of the barrel 26 is not emptied, the liquid column will impact on the liquid surface and the liquid will transmit the energy of the liquid column to the chisel surface 34. Of course the liquid column will then be shorter at the moment of impact and thus, both the energy and the duration of the pulse will be reduced.

It might not even be necessary that the barrel be transverse to the piston surface 34 of the chisel, that is, parallel with the chisel 24. An impactor with the barrel 26 transverse to the chisel 24 as shown in FIG. 8 will probably also operate satisfactorily. The details of FIG. 8 have been given the same reference numerals as corresponding details in the preceding Figures, and some reference numerals have been omitted since they depict details which are identical with those shown in the preceding Figures. The rear end face 34 of the chisel 24 is spherical instead of flat, but it may also be flat.

I claim:

1. In an hydraulic impactor wherein a piston surface (34) associated with a driven member (24) is loaded by means of impact of a liquid, the improvement comprising:

means defining a passage (36) through which a charge of liquid is passable;

means (37,63,56) coupled to said passage for substantially clearing said passage of liquid prior to passing of a charge of liquid through said passage prior to each impact;

a quick-opening valve (27) coupled to said passage (36) and having an inlet connectable to a source of high pressure liquid and an outlet (51) connected to said passage (36);

said piston surface (34) associated with said driven member being located at an end of said passage to define a wall of a working chamber (35) to which said passage (36) leads; and means for quickly opening said valve (27) to cause a liquid charge from said liquid source to rush through the liquid cleared passage (36) at relatively high velocity to provide a hammer-like pressure on said piston surface and apply impact energy to said driven member.

2. The hydraulic impactor of claim 1, wherein said source of high pressure liquid comprises an accumulator volume.

3. The hydraulic impactor of claim 2, wherein said accumulator volume comprises a conduit for high pressure liquid.

4. The hydraulic impactor of claim 1, wherein said means for clearing said passage (36) comprises valve means (24,38) connectable to a source of compressed air (63) and coupled to provide a flow of flush air into said passage (36) in response to a completed impact.

5. The hydraulic impactor of claim 1, wherein the area of said passage is smaller than the area of said piston surface.

6. The hydraulic impactor of claim 5, wherein the area of said passage is less than one quarter of the area of said piston surface.

7. The hydraulic impactor of claim 5, wherein the area of said passage is less than one tenth of the area of said piston surface.

8. Method of driving an impact element (24) by applying a shock load on a piston surface (34) associated with the impact element by means of a high velocity liquid charge, comprising:

placing said piston surface (34) at one end of a passage (36) thereby defining a wall of a working chamber (35) to which said passage (36) leads;

substantially clearing said passage (36) of any liquid contained in said passage (36) to provide a liquid cleared passage (36);

thereafter suddenly forcing a charge of pressurized liquid to rush towards said piston surface (34) through the liquid cleared passage (36) at a relatively high velocity, while said impact element (24) remains substantially fixed, and suddenly retarding said liquid charge upon impact of said liquid charge with said piston surface (34);

thereby transforming the momentum of the forced, high velocity liquid charge when it is suddenly retarded to provide a hammer-like pressure on said piston surface (34) and apply impact energy to said impact element (24).

9. The method of claim 8, comprising accelerating said charge of liquid directly in a substantially straight path which is transverse to said piston surface.

10. The method of claim 9, wherein said charge of liquid directly impacts on said piston surface.

* * * * *